United States Patent Office 2,694,875
Patented Nov. 23, 1954

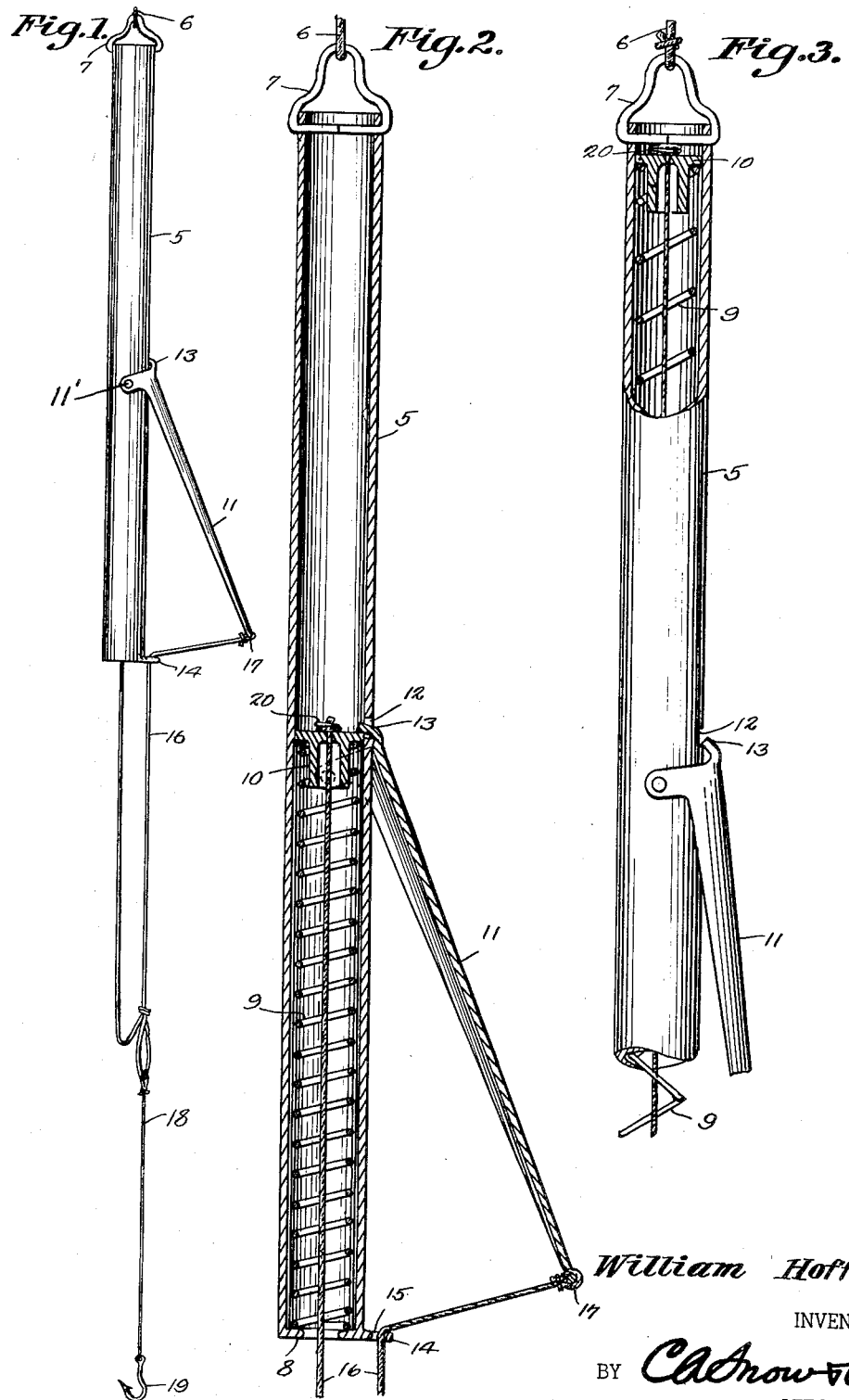

2,694,875

FISHING ATTACHMENT FOR FISHING LINES

William Hoffmann, Lyons, Kans.

Application September 16, 1952, Serial No. 309,781

1 Claim. (Cl. 43—15)

This invention relates to a device designed for attachment to a fishing line, the primary object of the invention being to provide means to be attached to such fishing line between the main portion of the line and hook leader thereof automatically operating when a fish grabs the hook in an attempt to remove the bait therefrom, resulting in the hook becoming embedded in the mouth of the fish.

An important object of the invention is to provide a device of this character which includes a spring-actuated fish hook for automatically snagging the fish, in making a strike to remove the bait, thereby relieving the fisherman of the responsibility of constantly watching a particular line to jerk the line when a fish makes a strike.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing,

Figure 1 is a side elevational view of a device constructed in accordance with the invention.

Fig. 2 is an enlarged longitudinal sectional view through the device.

Fig. 3 is an enlarged fragmental view partially broken away, illustrating the plug as biased to the limit of its movement in one direction, by the spring.

Referring to the drawing in detail, the device comprises the tubular body 5 to one end of which is connected the fishing line 6, by means of the link 7.

The opposite end of the tubular body is partially closed providing an annular shoulder 8 against which one end of the coiled spring 9 rests, the opposite end of the coiled spring 9 being held into engagement with the plug 10 by positioning one end of the coiled spring over said plug, as clearly shown by the drawing.

The reference character 11 indicates a trigger which is pivotally connected with the tubular body 5 at 11', at one end of the trigger, the body 5 being provided with the opening 12 through which the lip 13 of the trigger 11 extends, when the device is in a set position, the length of the lip 13 being such that it will engage the upper edge of the plug 10 when in its set position, to hold the plug 10 against the action of the coiled spring 9.

This trigger 11 is of a length so that the free end thereof extends to a point adjacent to the ear 14 that extends from one end of the body, the ear 14 being provided with the aperture 15, through which an actuating line 16 extends, the line 16 being connected with the trigger, at 17. This line 16 is formed into a loop, where it is connected with the leader 18 of the hook 19, the line 16 extending through the plug 10, where it is secured to the plug by the knot 20.

In the use of the device, the device is connected in a fishing line as described, and the line 16 is pulled to bring the plug 10 to a position below the opening 12 of the trigger. The trigger is now moved to position the lip 13 over one end of the plug, holding the plug in a set position against the action of the coiled spring 9 which has been placed under compression when the plug is moved downwardly in the body 5, by pulling the line 16.

Since the leader 18 which carries thhe hook 19 is connected with the line 16, it is obvious that when a fish makes a strike, or attempts to grab the bait, the pull on the line 16 will cause the trigger 11 to swing inwardly towards the body 5, releasing the lip 13 from the plug 10. The spring will now automatically force the plug 10 towards the end of the body 5 to which the fishing line 6 is connected, jerking the hook and embedding the hook in the mouth of the fish securely hooking the fish.

After the fish has been removed from the hook, the device is again baited and the baited hook cast into the water or stream being fished.

With a device as shown and described, it is obvious that a fisherman may attend several lines in fishing, thereby relieving the fisherman of the necessity of directing his attention to a single line in order to impart the necessary jerk to the line, when a fish makes a strike.

Having thus described the invention, what is claimed is:

A fishing device of the class described, comprising a tubular body having an opening in one wall thereof, a laterally extending apertured ear formed on one end of said tubular body, means for securing a fishing line to the other end of said tubular body, a spring biased plug slidable within said tubular body, a trigger pivotally mounted at one of its ends to said body and having a lip extending laterally from the pivoted end thereof adapted to extend through the opening in the wall of said tubular body into engagement with one end of the plug to hold the plug set against the action of said spring, a line having one of its ends connected with the plug, the other end of the line being connected to the free end of said trigger with an intermediate portion of the line passing through said apertured ear and said line being looped beyond the end of the tubular body, a leader and a hook secured to said leader, said leader being connected with the looped portion of said line and being adapted to operate said trigger to release the plug to the action of said spring when a fish strikes the hook on said leader, whereby said hook is jerked, embedding the hook in the mouth of the fish.

References Cited in the file of this patent

UNITED STATES PATENTS

| Number | Name | Date |
|---|---|---|
| 1,816,235 | Schroeder | July 28, 1931 |
| 2,316,256 | Kohn | Apr. 13, 1943 |